Patented Jan. 20, 1953

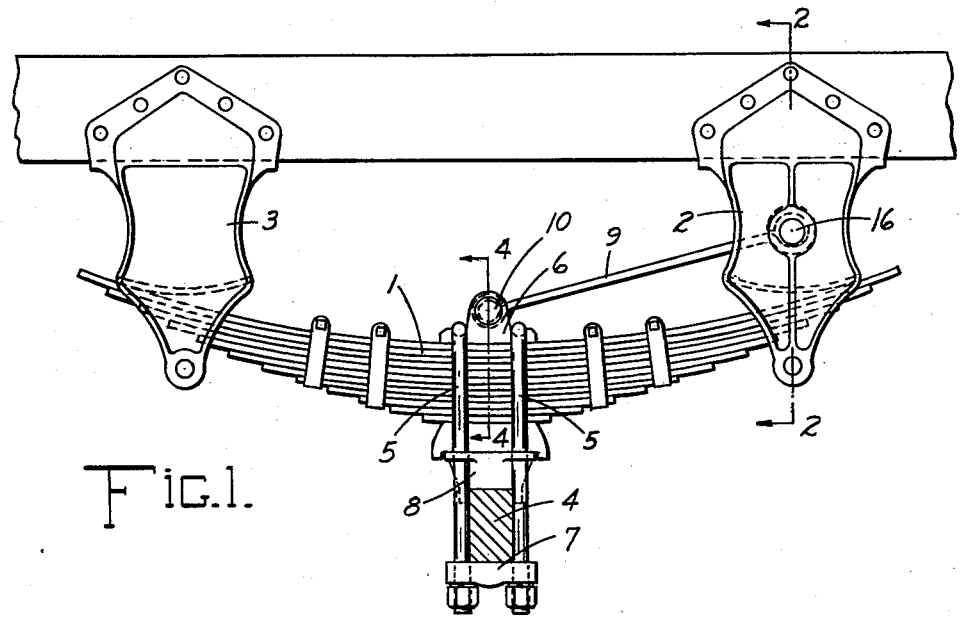
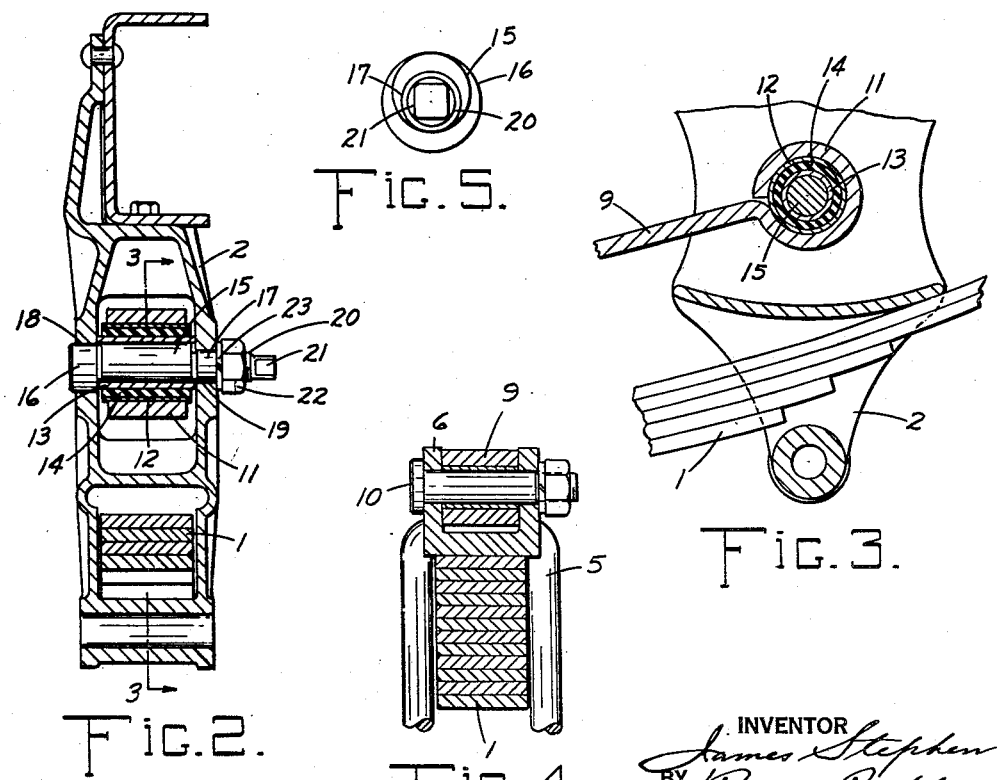

2,626,144

UNITED STATES PATENT OFFICE 2,626,144

ADJUSTABLE SPRING SUSPENSION

James Stephen, Edgerton, Wis., assignor to Highway Trailer Company, Edgerton, Wis., a corporation Application July 29, 1946, Serial No. 686,870

2 Claims. (Cl. 267—56)

This invention embodies improvements in spring suspensions for motor vehicles, and particularly that type of spring suspension which is used upon trailer vehicles wherein springs are disposed at opposite sides of the vehicle chassis, supported at their ends by conventional spring hangers, and carrying an axle at the center positions thereof. In spring suspensions of the above class, radius rods are customarily employed for connecting the middle of each spring with the trailer chassis, the radius rods absorbing the pull between the frame and the rear axle and maintaining proper alignment of the axle transversely to the chassis and in relation to the trailer king pin by which the trailer is connected to the fifth wheel of the traction vehicle.

The improvements of my invention concern particularly the radius rod connections between the trailer chassis and the springs. In assembling the rear axle unit and its supporting springs upon the chassis of the trailer it is common to generally connect up the parts, so that the axle is properly attached to its supporting pair of springs and the springs properly engaged with the spring hangers attached to the chassis. The final operation is the true aligning of the axle in proper transverse position relatively to the chassis, and this operation usually involves slight forward or rear adjustment of each spring by which the axle end is carried. According to my improved invention I utilize the radius rods, the forward ends of which are attached to the forward spring hangers and the rear ends of which are attached to the spring units or springs themselves, in conjunction with adjustable connections intermediate said rods and the spring hangers for obtaining the necessary or desirable adjustment of the springs and the axle carried thereby to properly align the axle vertically and transversely of the chassis. In addition my improved means involves so constructing said adjustable connecting parts that shocks incident to the movement of the axle from its free or normal lower position to the slam position, will be absorbed.

In the carrying out of my invention the adjusting and shock absorbing connections between the radius rods and the spring hanger units comprise unitary devices having the double function previously referred to.

The preferred construction of my invention and its mode of operation will be understood more clearly upon reference to the following detailed description, in connection with the accompanying drawings in which Figure 1 is a side elevation, showing a portion of the chassis of the trailer vehicle and the manner of mounting of the axle thereon utilizing radius rod connections involving my invention.

Figure 2 is a vertical sectional view taken about on the line 2—2 of Figure 1.

Figure 3 is an enlarged detail view bringing out more clearly the adjusting and shock absorbing connection between the front spring hanger and the radius rod.

Figure 4 is a fragmentary vertical sectional view taken about on the line 4—4 of Figure 1, showing the features more fully disclosed in Figure 1 of the middle spring bearing.

Figure 5 is an enlarged detail view in side elevation of the adjusting pin.

Referring to the accompanying drawings it may be noted that the general type of spring suspension shown therein is conventional in its primary features and comprises the employment of the spring unit 1, made up of the usual spring leaves, said unit being mounted at its ends on the front hanger 2 and the rear hanger 3. The spring unit 1 supports or carries the axle 4, which is connected thereto by the customary tie or U bolts 5 engaging at their upper ends the saddle bearing member 6 and connected at their lower ends with the clip plate 7. The usual clamping and bearing member 8 is provided intermediate the axle 4 and the bottom of the spring unit 1 and is interengaged by the U bolts 5 in the usual way. The spring unit 1 is connected to the front spring hanger 2 by a radius rod 9, the rear end of which is pivotally attached at 10 to the saddle bearing member 6, much after known practice.

My invention lies in the construction and mode of connection of the front end of the radius rod 9, with the hanger 2. For the latter purpose the front end of the rod 9 is formed with a bearing member or sleeve 11. To attach the rod 9 to the hanger 2 at the bearing member 11, I provide an adjusting and absorbing connector device. This device consists of a bearing unit made up of an outer sleeve 12, an inner sleeve 13 and an intermediate sleeve 14 made of rubber or equivalent resilient material. The bearing unit when produced is actually a unit in which the rubber shock absorbing sleeve 14 is united permanently to the outer sleeve 12 and the inner sleeve 13, as by vulcanizing or any other suitable process. Said unit is united permanently to the sleeve or bearing member 11 on the forward end of the radius rod 9 by a shrink fit of the sleeve 12 inside the member 11. The inner bearing sleeve 13 is of a length greater than the outer sleeve 12 for a purpose to be hereinafter described.

The bearing sleeve 13 surrounds a pin 15 which includes end heads 16 and 17. These heads are concentric about a common axis but that axis is eccentric as respects the axis of the part of the pin within the sleeve. Thus by turning the pin 15 the bearing unit 12—13—14 may be shifted slightly forwardly or rearwardly as may be required for the operation of true alignment of the axle 4. The pin 15 outwardly of the bearing portion 12 is formed with a threaded shank 20 integral therewith and provided with an outer extending multisided or square turning head 21, to which a wrench may be applied for turning the eccentric pin 15. A nut 22 is adapted to be screwed on the threaded shank 20 of the pin 15, and such screwing action will cause the sleeve 13 of the bearing unit to be clamped between the right side of the spring hanger 2 as seen in Figure 1 and the concentric bearing head 16. This clamping action is obtained by the rightward movement of the head 16 pushing the sleeve 13 against the inner face of the right-hand side of the hanger 2.

It will be understood, of course, that the single spring suspension unit and radius rod features just described will be in duplicate when mounted upon the chassis to support the axle 4 at its opposite ends, which axle, of course, supports the customary rubber tired wheels of the trailer or similar vehicle.

Now in the operation or use of my invention, it being assumed that the various members are assembled generally as shown in Figure 1, the final adjustment of the axle 4 for its true alignment will be obtained by applying a wrench to the turning head 21 of the eccentric pin 15, the nut 22 at the time being partially unscrewed, so that the radius rod connection is loose, so to speak, relatively to the spring hanger 2. The turning of the pin 15 will be either rightwardly or leftwardly depending upon which direction of movement of the axle 4 is required for proper alignment, and when this adjustment of the eccentric pin 15 has been accomplished the nut 22 will be screwed tightly against the adjacent side of the spring hanger 2. This last action by the nut 22 will exert a slight endwise movement outwardly upon the pin 15 and particularly its concentric head 16 so as to cause said head to push endwise against the bearing sleeve 13 and clamp the latter rigidly against movement by impingement of its outer end against the inner face of the inner side of the hanger member 2. Under these conditions the adjustment of the eccentric pin 15 is fixed and moreover the sleeve 13 is prevented from turning movement by the clamped adjustment thereof.

Therefore, in the down and up movements of the spring unit 1 from free to slam positions, since the torque rubber bearing member 14 is fixed to the sleeve 12 and thereby to the bearing portion 11 of the radius rod, and since the bearing sleeve 13 is fixed against rotation, the torque of the swinging of the radius rod 9 upwardly and downwardly will be absorbed by the rubber bearing or cushion member 14 acting as a torque resisting cushioning device.

If desired there may be interposed between the nut 22 and the adjacent side of the hanger 2 a spring lockwasher 23.

My construction of radius rod connecting means intermediate the spring unit and the front spring hanger 2 will therefore be seen to provide for ready and quick proper adjustment of the axle 4, to any degree desired within the compass of the throw of the eccentric pin 15, and in addition the special connector between the rod and said front hanger affords the provision of a torque resistant cushion bearing the advantages of which will be apparent to those versed in the art.

Having thus described my invention what I claim as new and desire to secure by Letters Patent of the United States is:

1. In a spring suspension for axles, in combination, a vehicle frame, front and rear spring hangers carried thereby, a spring unit having its opposite ends movably mounted in said hangers, an axle supported on the middle portion of the spring unit, and radius rod connecting means intermediate the spring unit and one of said hangers including a radius rod connected at one end to the spring unit, and a shock absorbing connector unit connecting the other end of the radius rod with one of the hangers and comprising relatively movable parts, one of which is shiftable to move the spring unit and axle longitudinally relatively to the vehicle, means to actuate said shiftable part to move the said axle, and means to hold the shiftable part stationary on its hanger and simultaneously render the shock absorbing function of said connector unit effective.

2. In a spring suspension for vehicles, in combination, a frame, a spring hanger mounted on said frame, a spring unit having an end thereof movably carried in said hanger, an axle supported on said spring unit, and radius rod means intermediate the spring unit and said hanger, said radius rod means comprising a shock absorbing unit connecting the hanger and radius rod for resisting the torque of movement of the radius rod incident to the movement of the rod relatively to the hanger, the shock absorbing unit comprising a resilient torque resisting member having a portion connected for movement with the radius rod and having another portion immovably connectible to the spring hanger, an eccentric adjusting pin mounted in the hanger coaxial with said torque resisting member and movable to shift the member and the end of the radius rod connected therewith, relatively to the hanger, fastening means for the adjusting pin operable to release its connection to the hanger, and a head on said pin to turn the same.

JAMES STEPHEN.

REFERENCES CITED

The following references are of record in the file of this patent:

UNITED STATES PATENTS

| Number | Name | Date |
|---|---|---|
| 673,110 | Bronder | Apr. 30, 1901 |
| 1,544,708 | Wells | July 7, 1925 |
| 1,778,503 | Lord | Oct. 14, 1930 |
| 1,954,277 | Zerk | Apr. 10, 1934 |
| 2,048,256 | Geyer | July 21, 1936 |
| 2,123,089 | Leighton | July 5, 1938 |
| 2,153,083 | Griswold | Apr. 4, 1939 |
| 2,153,271 | Paton | Apr. 4, 1939 |
| 2,188,952 | Leighton | Feb. 6, 1940 |
| 2,191,941 | Reid | Feb. 27, 1940 |
| 2,308,967 | Kuss | Jan. 19, 1943 |
| 2,407,345 | Reid | Sept. 10, 1946 |